US012032366B2

(12) United States Patent
Kuhn et al.

(10) Patent No.: US 12,032,366 B2
(45) Date of Patent: Jul. 9, 2024

(54) METHOD AND APPARATUS FOR SIMULATING THE MACHINING ON A MACHINE TOOL USING A SELF-LEARNING SYSTEM

(71) Applicant: DMG MORI Digital GmbH, Bielefeld (DE)

(72) Inventors: Tommy Kuhn, Ammerbuch (DE); Daniel Niederwestberg, Melle (DE)

(73) Assignee: DMG MORI DIGITAL GMBH, Bielefeld (DE)

( * ) Notice: Subject to any disclaimer, the term of this patent is extended or adjusted under 35 U.S.C. 154(b) by 164 days.

(21) Appl. No.: 17/494,231

(22) Filed: Oct. 5, 2021

(65) Prior Publication Data
US 2022/0121183 A1    Apr. 21, 2022

(51) Int. Cl.
G05B 19/418    (2006.01)
(52) U.S. Cl.
CPC ........... G05B 19/41885 (2013.01); G05B 2219/32335 (2013.01); G05B 2219/33301 (2013.01)
(58) Field of Classification Search
CPC .... G05B 19/41885; G05B 2219/32335; G05B 2219/33301; G05B 2219/35308;
(Continued)

(56) References Cited
U.S. PATENT DOCUMENTS

2015/0378333 A1*  12/2015 Fujii .................. H02P 23/14
                                                  700/29
2016/0123341 A1*   5/2016 Higashi ............. F04D 27/02
                                                  702/96
(Continued)

FOREIGN PATENT DOCUMENTS

DE    10 2010 012620 A1    9/2011
DE    11 2018 005809 T5    8/2020
(Continued)

OTHER PUBLICATIONS

European Patent Office, Extended European Search Report, Application No. 21201684.4-12015, dated Feb. 8, 2022, in 9 pages.
(Continued)

Primary Examiner — Thomas C Lee
Assistant Examiner — Michael Tang
(74) Attorney, Agent, or Firm — Procopio, Cory, Hargreaves & Savitch LLP

(57) ABSTRACT

A method and a device for simulating a machining process of a workpiece on an NC-controlled machine tool by means of a self-learning artificial neural network. Process parameters both from a machining process on a real machine tool located in a manufacturing section and a digital machine model implemented in a simulation section are provided to the artificial neural network to learn the behavior of the machine tool including the tools and workpieces used and are reformatted into input parameters by means of mathematical transformation. By learning the behavior of the machining process, the artificial neural network ca, send output files back to the simulation software of the simulation section and optimally adapt the behavior of the digital machine model to the conditions of the real machine tool by adapting the simulation parameters and make it more efficient in order to optimize the machining process on the machine tool.

18 Claims, 8 Drawing Sheets

(58) Field of Classification Search
CPC .............. G05B 13/027; G05B 17/02; G05B 2219/33027; G05B 19/4069; G06N 3/08; G06N 20/10; Y02P 90/02
USPC .......................................... 700/173
See application file for complete search history.

(56) References Cited

U.S. PATENT DOCUMENTS

| | | | | |
|---|---|---|---|---|
| 2018/0375942 | A1* | 12/2018 | Liu | H04L 67/125 |
| 2019/0018391 | A1* | 1/2019 | Rogers | G05B 19/4097 |
| 2019/0384240 | A1* | 12/2019 | Seki | G05B 23/0254 |
| 2020/0293021 | A1* | 9/2020 | Goya | G05B 19/4069 |
| 2021/0018903 | A1* | 1/2021 | Muneta | G05B 19/41885 |

FOREIGN PATENT DOCUMENTS

| | | | |
|---|---|---|---|
| DE | 112018005809 | T5 | 8/2020 |
| EP | 1901149 | B1 | 3/2008 |
| JP | 2009163507 | A * | 7/2009 |
| WO | 2012/168427 | A1 | 12/2012 |

OTHER PUBLICATIONS

European Patent Office, Communication pursuant to Article 94(3)EPC, Application No. 21 201 684.4-1205, dated Dec. 18, 2023, in 10 pages.

* cited by examiner

Fig. 7

| Value | Virtual | Real | Exemplary format |
|---|---|---|---|
| Tool type/ID | x | | 1203404 |
| Workpiece material | x | | AL7075 |
| Time stamp | x | x | 2020/07/21 17:02:45.12 |
| Engagement depth | x | | 2mm |
| Engagement width | x | | 3mm |
| Material removal rate | x | | 1.23mm³ |
| UUID (operation) | x | x | 12030fs3dfs3 |
| Spindle power | x | | 20.4kW |
| Spindle speed | x | x | 12034rpm |
| Axis feed (Xx) | x | x | 3.4m/min |
| Axis power (Xx) | x | x | 2.4kW |
| TCP | x | x | (120.3;12.6;24.3; 0;0;1) |

METHOD AND APPARATUS FOR SIMULATING THE MACHINING ON A MACHINE TOOL USING A SELF-LEARNING SYSTEM

CROSS REFERENCE TO RELATED APPLICATIONS

This application claims priority to German Patent Application No. 102020212798.0, filed Oct. 9, 2020, the contents of which are incorporated herein by reference in its entirety for all purposes.

DESCRIPTION

The present invention relates to an apparatus and a method for simulating a machining process of a workpiece on a machine tool by means of a self-learning artificial neural network, wherein the artificial neural network can receive process and parameter data of the machining process both from a real machine tool and from a digital machine model and uses them to optimize the simulation and/or the real machining process.

BACKGROUND OF THE INVENTION

Due to the continuous increase in complexity of today's workpiece machining processes, in particular in the area of machine-executed or machine-supported machining of workpieces, new types of machine tools are usually confronted with a large number of increased qualitative or economic requirements. More and more difficult process mechanics require an increasingly powerful and/or precise machine kinematics accompanied by improved functions of the machine mechanics, the drives or the control, but in most cases also result in increased set-up times as well as test runs that are difficult, involve losses and are especially costly.

A machine tool simulation preferably reproduces the course of the respective workpiece machining process on a digital machine tool model. For this purpose, various mechanical models such as multi-mass models, geometric kinematics or finite-element models are used to describe the physical properties and interactions of the machine elements and workpieces and are combined with control software for moving the machine elements. In addition, the process simulation based on a penetration calculation between workpiece and tool may also be used to advantage.

EP 1901149 B1 shows a machine simulation for defining a sequence for machining a workpiece on a machine tool, wherein, in particular, a data structure was integrated into the simulation which makes it possible to integrate data or behavior of elements recorded by sensors on real machine tools and thus to further improve the control description of the implemented machine model.

Moreover, WO 2012/168427 A1 shows a machine simulation of a work process on a machine tool using a virtual machine in which CNC-controlled sub-processes can be distributed over different processor cores that operate in parallel and can thus be calculated in parallel to accelerate the simulation processes.

However, in the simulations of machine tools within a tool machining process according to the prior art, there was always the problem that an exact specification of all the state parameters of the machine tool, the tool used and/or the workpiece, and especially the temporal evolution of the physical properties thereof, is not possible without great effort.

One object of the invention is therefore to provide a method for simulating a machining process of a workpiece on a machine tool and an apparatus for simulating such a machining process, which solve the aforementioned problems of the prior art and which in particular allow for adapting the digital machine model within the process simulation to the conditions and properties of the real machine tool and/or to improve it as efficiently, inexpensively and quickly as possible. In addition, it is an object to optimize the adaptation of the simulation and the associated simulation parameters in such a way that it can be automated and thus carried out independently of human misjudgments as far as possible.

DETAILED DESCRIPTION OF THE INVENTION

The features of the independent claims are proposed to achieve the above-mentioned objects. The dependent claims relate to preferred embodiments of the present invention.

The invention specifies a method and an apparatus for simulating a machining process of a workpiece on a machine tool, which are configured to use the generation of simulation data by the simulation of the machining process carried out in a simulation section of the method on a digital machine model and the recording of machining data of the machining process on the real machine tool implemented in an independent manufacturing section of the method in order to collect comparison data between the simulated and the real machining process and to feed them to an artificial intelligence (AI) implemented in an analysis section of the method for improving the effectiveness of the simulation. An artificial neural network is advantageously used as the artificial intelligence and the data model for storing the simulation data is particularly advantageously configured as a time-continuous data model.

The control of the digital machine model and the real machine tool is preferably carried out as a function of previously defined NC and/or PLC data and the analysis section is configured such that it learns the behavior of the machine tool, at least one tool and/or the workpiece by feeding the simulation and machining data to the AI machine, and, for example, outputs simulation change parameters for changing and/or optimizing the simulation properties as an output data set (output of the AI for process control, prognosis and optimization). Moreover, a state modeled by the AI may be used to interpret and optimize the actual machine tool state.

The invention, in particular due to the (preferably automatic) improvement of the simulation, also called machining process simulation, by means of self-learning AI, thus creates a more precise and at the same time more cost-effective and efficient simulation environment compared to the prior art, preferably acting independently and thus not requiring additional pauses or waiting times. In addition, evaluating and interpreting the resulting simulation data enables a simplified and equally precise optimization of the actual tool machining process, in particular since possible inefficient settings within the machine tool can be recognized quickly and without the aid of complex sensors by means of the machining process simulation and can be adjusted for the respective work step.

Preferably, the digital machine model may already be a remanufacturing of the machine tool of the machining section which is as accurate as possible even before the optimization by the AI, particularly preferably a digital twin (digital image of the real machine tool), so that a change in the simulated machining process within the simulation section can output a prognosis about the outcome of the machining process on the machine tool (machining process analysis) which is as exact as possible, insofar as it undergoes the same changes.

At the same time, the AI arranged in the analysis section may preferably be configured such that, by means of the above-mentioned learning process, it can recognize differences between the machining process of the digital tool model and the machine tool within the machining section and can be used for automatic improvement of the machining process simulation via the output of the simulation change parameters.

For example, in a preferred exemplary embodiment, the AI may be configured to adapt the conditions of the simulated machining process to the machining process of the machine tool via the output of the simulation change parameters so that the smallest possible difference between the simulated machining process and the machining process on the machine tool is achieved. This has, in particular, the advantage that by precisely adapting the simulation process, not only more precise and thus more realistic simulation prognoses for the respective machining process can be made, but these can also be used for a more precise optimization of the machining process on the machine tool.

In a further preferred exemplary embodiment, the AI may also be configured, by learning the behavior of the machine tool, the workpiece to be machined, and various tools, to additionally use the most efficient setting variants of future (or currently performed, i.e. provision of the optimization parameters in real time in parallel to the actual machining process currently running) machining processes (for example, by changing rotation speeds, traveling paths, tools to be used, workpiece geometries or process trajectories) in the simulation section. In other words, the AI may be used to improve the machining process simulation, preferably not only by optimizing and/or adapting existing simulated processes, but also by a prediction method preceding the simulation process (or in parallel to the real machining process). For this purpose, the simulation data may preferably also be described by the simulation change parameters integrated in the output data set so that, on the one hand, known data structures are retained in every optimization method and thus be used efficiently, and on the other hand, any run-in times of the simulated and/or real machining process can be reduced to a minimum by the AI generated prognosis.

Preferably, the output data set of the analysis section containing the simulation change parameters may be fed back to the simulation section in order to optimize the machining process simulation, for example to match the simulated machining process with the machining process of the machine tool and/or to predict an efficient process sequence so that, preferably, a closed program loop is created and the respective simulation can be optimally configured.

The introduction of the output data set into the simulation section may preferably be associated with the simulation software in such a way that at least one simulation parameter, but preferably all of the simulation parameters declared as to be changed by the analysis section, are adjusted by integrating the output data set of the analysis section into the simulation section. For this purpose, the individual simulation change parameters of the output data set may, for example, preferably be provided with digital simulation markers, which are preferably read within the simulation software and instruct the simulation software to set the simulation parameters associated with the simulation markers to the values stored as simulation change parameters. The artificial neural network may also advantageously be configured to optimize the simulation parameters of the simulation of the machining process in such a way that the smallest possible difference between the selected process parameters of the machining data and the simulation data results.

The simulation change parameters of the output data set may include various, preferably all, of the simulation parameters of the simulation software to be changed, such as the geometries of tool equipment or machine elements, grinding or cutting conditions, trajectories or physical properties (temperature, elasticity, coefficients of friction, etc.) of machine or workpiece elements, but may also include complete chains of commands or fundamental changes to settings, for example the selection of the respective machine model, thereby providing the artificial intelligence with the maximum number of degrees of freedom for optimizing the simulation. Likewise, the output data of the analysis section may preferably have the same data formats as the simulation data of the simulation section and the processing data of the manufacturing section, so that the read-in and read-out speed of the respective speed can be optimally used by omitting possible parsers.

In a particularly preferred embodiment, the program loop, which includes at least the simulation of the machining process, the feeding of the simulation data into the analysis section, the introduction of the output data set into the simulation section and the setting of the simulation parameters based on the output data set, may be carried out iteratively and preferably automatically, the number n of iteration steps being at least n≥1. As described above, a new machining process, for example with a changed workpiece and/or changed tools or tool settings, may preferably be carried out within the simulation section in each iteration, and may be taught to the AI and adapted thereby, thereby generating an optimization method constantly evolving in each iteration step.

The essential process steps within an iteration of the program loop and with each another may be understood as a fluent method, and they may preferably begin first with the transmission of the output data set based on the information learned by the AI to the simulation section, thereby making it possible to optimize, based on the simulation change parameters implemented in the output data set, the simulation parameters in advance of the actual simulation. In a next step, the simulation of the respective machining process may then be carried out and result data obtained in this way may be fed as process parameters for teaching the AI to the analysis section containing the artificial intelligence. The latter may preferably be carried out in such a way that both the process parameters of the simulation section and the process parameters generated on the machine tool in the machining section are recorded in the analysis section, linked to one another and then transmitted directly to the AI as input parameters used to teach the AI. Such a program loop thus allows for an improved optimization capability of the system to be exhibited by every further machining process simulation since the AI constantly receives new information about the machine tool, the workpieces and the tool and learns it.

However, the sequence and mode of action of the process steps mentioned is not restricted to the exemplary embodiment mentioned. For example, the machining process simulation may preferably be carried out as the first step and the process parameters obtained in this way may be fed to the AI as an "actual value" of the current simulation, which it may interpret and optimize in turn by transferring the output data to the simulation section.

Likewise, the optimization process may preferably also be carried out independently of the machining process within the machining section or on the machine tool. In a particularly preferred exemplary embodiment, the AI may, for example, only use the information/knowledge about the machine tool, workpieces and tools obtained in earlier learning phases and thus optimize the respective simulation according to the operator's/user's wishes. Additional process parameters of the machining section may be generated, for example, by a machining process carried out later or earlier on the machine tool, but also before or after the associated simulation, so that the learning of the AI can be completed before the actual simulation or can be expanded at a later point in time, resulting in maximum flexibility of the specified optimization process.

The process parameters of the simulation and machining data may preferably differ from the simulation parameters of the machining process simulation in such a way that they only include information relating to the machining process, i.e. properties of the actual (real) or simulated machine tool, the tools used and the workpiece, but preferably not, at least in the case of the process parameters of the simulation data, relating to superordinate simulation settings (e.g., information from the simulation model or simulation functions used). Thus, in this case, similarly to people involved in a manual optimization process, the AI only has learning parameters that are measurable on the machine tool available for teaching and optimizing the simulation, thus reducing the occurrence of artificial errors or wrong decisions by the former to a minimum.

Preferably, the simulation data may also be generated in such a way that, at least for each process parameter of the machining data, an equivalent process parameter exists or can be generated in the simulation data or can be derived from individual process parameters within the simulation data, thereby further maximizing the number of training parameters to be used for the AI, which can thus be trained as variably as possible. In a particularly preferred embodiment of the invention, the data sets of individual process parameters in the simulation and machining data may also be time-dependent, wherein at least one corresponding process parameter within the simulation data preferably exists at any point in time of the process parameter of the machining data and can be assigned to the process parameter of the machining data.

The described linking of the process parameters of the simulation section to the process parameters of the machining section, but also the general generation of the simulation data by the machining process simulation, also has the advantage that these can not only be used as comparison data for AI learning, but preferably also allow for direct conclusions regarding the (e.g., currently running) machining process on the machine tool. Using data generated from the simulation, for example wear, temperature or movement data of individual machine or workpiece elements, a user/employee may also identify errors or incorrect settings on the machine tool and thus may take measures with the aid of the machining process simulation (which is, for example, running in parallel) to optimize the machining process. In other words, the mentioned optimization processes by the AI cannot only be used for analysis and/or for more precise simulation of the machining process, but also serve to optimize the machine tool of the machining section so that the machining process can be run more efficiently and with higher quality.

In a particularly preferred example, these measures may also be taken fully automatically, preferably by means of feedback between the simulation section and the machining section, and may thus be viewed as a further optimization process of the AI. Process parameters (for example PLC and/or NC data, tool selections or speeds) present in both the machining section and the simulation section may also be transmitted time-dependently. e.g. from the simulation section to the machine tool, and may be used for improved control of the machine tool within the machining process. In a further exemplary embodiment, these process parameters may also be transmitted directly with the aid of the output file of the AI. In other words, the AI may preferably also be configured in such a way that it can control both the machining process on the machine tool and the digital machine model and thus optimize them at the same time by implementing the output file in the machining section and the simulation section. Such a method may therefore not only independently improve the machining process on the basis of previous work processes and thereby, depending on the level of training of the AI, reduce the time and cost of the optimization process to a minimum, but may also guarantee a digital machine model from which a large amount of information significant for the machining process can be obtained.

To further improve the method, the process parameters of the simulation and machining section may also be stored in a data memory provided for this purpose, preferably also after generation on the respective manufacturing or simulation section or before being fed into the analysis section, wherein the corresponding simulation data are preferably added to a simulation database implemented in the iteration loop and the process parameters of the manufacturing section are added to a manufacturing database which is separate or arranged independently of the simulation sequence and may be declared as accessible for the respective operator. This has the particular advantage that the operator can also look at the results of previous AI decisions at a later point in time, e.g. after further learning and/or optimization iterations, evaluate them if necessary and use them to adopt certain machining process improvements or changes. Furthermore, the intermediate storage of the individual process parameters in the respective databases allows for the AI to be reset to earlier learning stages in the event of incorrect or unsatisfactory result parameters.

In order to learn and optimize the machining process by means of the AI, a number of process parameters of the simulation section and the manufacturing section, preferably from the simulation and the manufacturing database, may also be introduced into the analysis section, in which they are converted to individual input parameters adapted to the AI by comparison and are fed to the latter. The input parameters are preferably not limited to the process parameters per se or direct comparison thereof between the machining process practiced in the machining section and the simulated machining process, but may, for example, also represent the combination of a plurality of process parameters, mechanical, economic or qualitative evaluations based on the process parameters or related functions so that the AI can be taught freely according to the operator's wishes and can be used to optimize the machining process simulation.

Furthermore, for generating these input parameters, the analysis section may preferably include a plurality of processing segments, but at least one data linking section and a data interpretation section, which are preferably connected upstream or in parallel to the input into the AI. The data linking section may preferably be configured such that it receives the simulation and machining data stored in the manufacturing database and simulation database, searches for correspondingly comparable process parameters and first links them as a data bundle and transfers them to the data interpretation section, wherein linking corresponding simulation and machining data may preferably be implemented by continuous data mapping. (In particular, a time-continuous mapping method may be used, with the mapping, for example, advantageously being carried out via the association of the operations/machining steps carried out, the NC line and/or the axis position.) In turn, the data interpretation section may analyze, in a particularly preferable embodiment, linked simulation and machining data in this respect, compare them with other data bundles and generate any number of input parameters for the AI from them, which it also forwards to the artificial intelligence. With the help of such processing segments, which preferably act independently of one another, an optimized and, in particular, fast method for iterated feeding of the input parameters into the AI can be implemented, which can be freely adjusted for the respective operator, for example through a preferably additional input interface via a code to be implemented for controlling the processing segments.

Moreover, the artificial intelligence ultimately obtaining the input parameters may be directly connected to the output of the processing segments and preferably be configured as a cluster method, support vector machine or particularly preferably as an artificial neural network. The latter may also preferably have a typical network structure that can also be changed within the analysis section, for example a single or multi-layer feed-forward or recurrent network, so that an optimal improvement method can be selected depending on the complexity of the machining process to be optimized. In order to optimize the simulated machining process, any learning algorithm of the artificial neural network with the desired activation functions may further be implemented, wherein said algorithm is preferably configured at least in such a way that the simulation change parameters or simulation parameters generated with the aid of the artificial neural network ultimately result in the desired optimization of the machining process simulation, for example by adapting the simulation to the conditions on the machine tool or targeted setting prognoses for new process simulations.

As already mentioned, the use of AI to optimize the simulated machining process has the advantage that it can be variably adapted to the respective problem or the respective preferences of the operator and can be operated during the optimization process without human intervention, which in particular minimizes time and labor costs. In addition, however, there are also other purposes: in a particularly preferred embodiment, the learning of the AI and the optimization of the simulation process by the AI may also be carried out in parallel and/or independently of the respective real machining process on the machine tool, which may lead to further time savings. Similarly, the AI's training process may also be configured in such a way that it is carried out in a segment preceding the simulation and processing process, for example by making a plurality of training data sets available before machining starts. In particular, in this way, networks that have already been trained can also be used for multiple process simulations since the training data naturally does not necessarily have to be dependent on the structure of the respective machine tool or the respective machining process and may thus offer an optimal basis for more specific learning phases. The artificial neural network may thus be trained with training data sets in a training process preceding the simulation and machining process.

In a further preferred exemplary embodiment, the AI may also store the output data sets produced in an expandable technology database in which the simulation change parameters introduced can be both viewed and returned to the AI. Thus, on the one hand, there is the possibility that an operator can understand the simulation data generated in each iteration on the basis of the simulation change parameters and can continue to use them in appropriate cases; the latter, on the other hand, can also preferably be used to further improve the above-mentioned learning and optimization processes, for example by again adding individual simulation change parameters to a recurrent network system. Moreover, at least the technology database, the simulation database and the manufacturing database may preferably be arranged in an external system, for example a cloud or an external network, so that the operator or manufacturer, but also external employees, can efficiently access the stored data and use them, for example, for further machining or change processes, preferably for a plurality of machine tools.

In order to ensure generally the same requirements for the machining process within the simulation and manufacturing sections, the two method sections may also comprise further properties. For example, the digital machine model implemented within the simulation section may preferably create the entire geometry of the machine tool, the tools used and the workpiece to be machined, but at least the parts required for the corresponding machining process according to their real equivalent. In addition, in an extremely preferred exemplary embodiment, the NC data and/or PLC data used to control the individual machine elements of the machine tool may also be used in the same form to move the simulated elements of the digital machine model so that an exact digital copy of the real machine tool is available within the simulation section.

Such a machine model, already described previously as a digital twin, has the particular advantage that any properties or results of the machining process simulation can be compared directly with the data of the real machine tool. In addition, the simulation of the machining process on such a model may preferably also output physical parameters, e.g. temperature, elasticity, coefficient of friction, etc., of the machine tool or the tools and/or the workpiece to be machined, which are difficult to determine in reality or can only be determined with great effort, and thus can identify any problems within the machining process quickly and efficiently. For this reason in particular, the digital machine model may therefore also preferably output at least time-dependent data series of these physical parameters, which, for example, may be defined via additional time and position markers linked to the data series depending on the time of the respective machining process and/or the respective work step and may be output as process parameters.

In order to further improve the comparability of the digital machine model and the real machine tool at the same time, an analysis of the elements of the machine tool, the workpiece and/or the tools used in each case which was carried out during a product analysis section may also be carried out on the real machine tool, preferably during and/or after the machining process on the real machine tool, which may be implemented, for example, by sensors implemented on the machine tool or externally mounted analysis units. Here, too, the collected data are preferably defined as process parameters and stored in the above-mentioned manufacturing database.

Furthermore, the above-mentioned NC and/or PLC and geometry data used to define the digital machine model and the real machine tool may preferably be adapted to the process development in an input data pre-processing section prior to the machining process. For example, at least the work steps of the machining process defined by the NC and/or PLC data on the machine tool and on the digital machine model may preferably initially be generated on an upstream CAD/CAM system and may be transferred as an operation file from the CAD/CAM system to the mentioned input data pre-processing section, wherein an operation file is to be understood as a general data package with information, for example, about the machine, tool and workpiece geometry, the sequence of movements of the individual elements and/or identification structures such as UUIDs. Depending on the data format of the operation file, the input data pre-processing section may also include one or more parsers which convert the former into a suitable input format before further processing, and the input data pre-processing section itself can process operation files that are formatted differently and/or generated externally.

The operation file developed in the CAD/CAM system may then be converted into an NC data format within the input data pre-processing section and may be transferred to the manufacturing section or, with the corresponding manufacturing and status data of the machine tool to be simulated, the tool and/or the workpiece to be machined, which are likewise reformatted, to the simulation section. This has the particular advantage that the operation file may be reformatted independently of the respective simulation cycle and thus does not unnecessarily hinder it or slow it down.

In addition, as a result of the reformatting of the operation file into the NC format to identify the respective work step, an additional step marker may preferably be inserted into the NC data so that the real machine tool and the digital machine tool model, for example with the help of a control model, can interpret the step marker within the machining process and can thus understand during the machining process in which work step the (digital) machine tool currently is.

In a further preferred embodiment, the work steps previously stored in the NC data may additionally be output as a reformatted structure file, for example from the input data pre-processing section as an XML or STEP file, for interpretation in other simulation systems, as a result of which the aforementioned formatting process can also be used when changing the respective simulation engine and can therefore be viewed independently of the simulation process. Likewise, on the other hand, the machine tool and the digital machine model may preferably also be configured in such a way that said work steps and/or process information can be taken from other data formats, for example via a further parser module, and interpreted for transferring and implementing the respective work steps contained, thereby preferably enabling communication with other simulation networks or even parallel processing of different simulations.

In summary, based on the features mentioned above, a method for simulating machining on a machine tool using a self-learning artificial intelligence can be implemented in which the simulation for the analysis and improvement of machining processes used on machine tools can be optimally adapted to the properties of the respective real machining process using an AI learning process by means of comparison data based both on simulation and machine tool data and can thus be used to predict machining processes that are still to be developed. Here, the optimization process of the simulation preferably primarily comprises the execution of the simulation of the machining process on a digital machine model implemented in a simulation section, the transfer of the simulation results as process parameters to the artificial intelligence arranged in an analysis section, the learning of the artificial intelligence based on the comparison of the process parameters of the simulation section with those of a machine tool, and the feedback of the simulation parameters to be changed to the simulation section by means of an output file generated by the AI. The necessary optimization steps may also be carried out independently or in parallel to the respective machining process on the real machine tool and can be implemented fully automatically after teaching the AI, which can also be carried out before the actual manufacture. Moreover, the method has the advantage that the identical NC data and, in the case of simulation, geometry data are used to control both the real machine tool and the digital machine model, which enables the generation of an exact digital copy of the real machining process and is supported by additional analyses on the machine tool, the workpiece and the tools used.

Accordingly, a corresponding apparatus which achieves the features mentioned above and can be used to simulate the machining process of a workpiece on a machine tool by means of a self-learning artificial intelligence may also preferably be implemented.

This apparatus may therefore preferably comprise at least one machine tool for machining the respective workpiece using the aforementioned NC data, a simulation device that can be controlled independently of the machine tool, for example a mainframe computer or a server, for simulating the machining process on a digital machine model, and an analysis unit connected to the machine tool and the simulation device which is configured, by means of implemented artificial intelligence, to adapt simulation parameters within the simulation device, to learn the behavior of the machine tool, the workpiece used and/or the tools and to output results thereof using an output data set. Furthermore, the machine tool is configured to transfer the machining data generated during or after the machining process, equivalently to the simulation data developed in the simulation device, to the analysis unit, whereby the aforementioned program or iteration loop between the analysis unit and the simulation device may result.

Likewise equivalently, for the separate optimization of the process simulation, at least the analysis unit and the simulation device may preferably also act independently of the machining process of the machine tool so that a plurality of optimization processes or simulation processes guided by the AI can be carried out iteratively via the aforementioned program loop, but these processes optionally can also be expanded at any time with process parameters of the machine tool, for example via access to the corresponding database, with further information.

In order to transfer information between the individual apparatus elements, the machine tool, the simulation device and the analysis device may furthermore preferably be configured such that they can transmit data independently of one another, in particular the aforementioned simulation and machining data and the output file generated by the analysis device, but also hardware and/or program data can be transferred to each other and these may preferably also be stored in corresponding data memories or a centrally located storage server so that the simulation and optimization process can be carried out optimally. In a particularly preferred exemplary embodiment, this transmission may be carried out, for example, by means of an intranet and/or an Internet.

BRIEF DESCRIPTION OF THE FIGURES

FIG. 7: shows an exemplary list of parameters to be taken from the virtual and real machine tools

DETAILED DESCRIPTION OF PREFERRED EMBODIMENTS

In the following, exemplary embodiments of the present invention are described in detail based on exemplary figures. The features of the exemplary embodiments can be combined in whole or in part and the present invention is not limited to the exemplary embodiments described.

Figure 1:
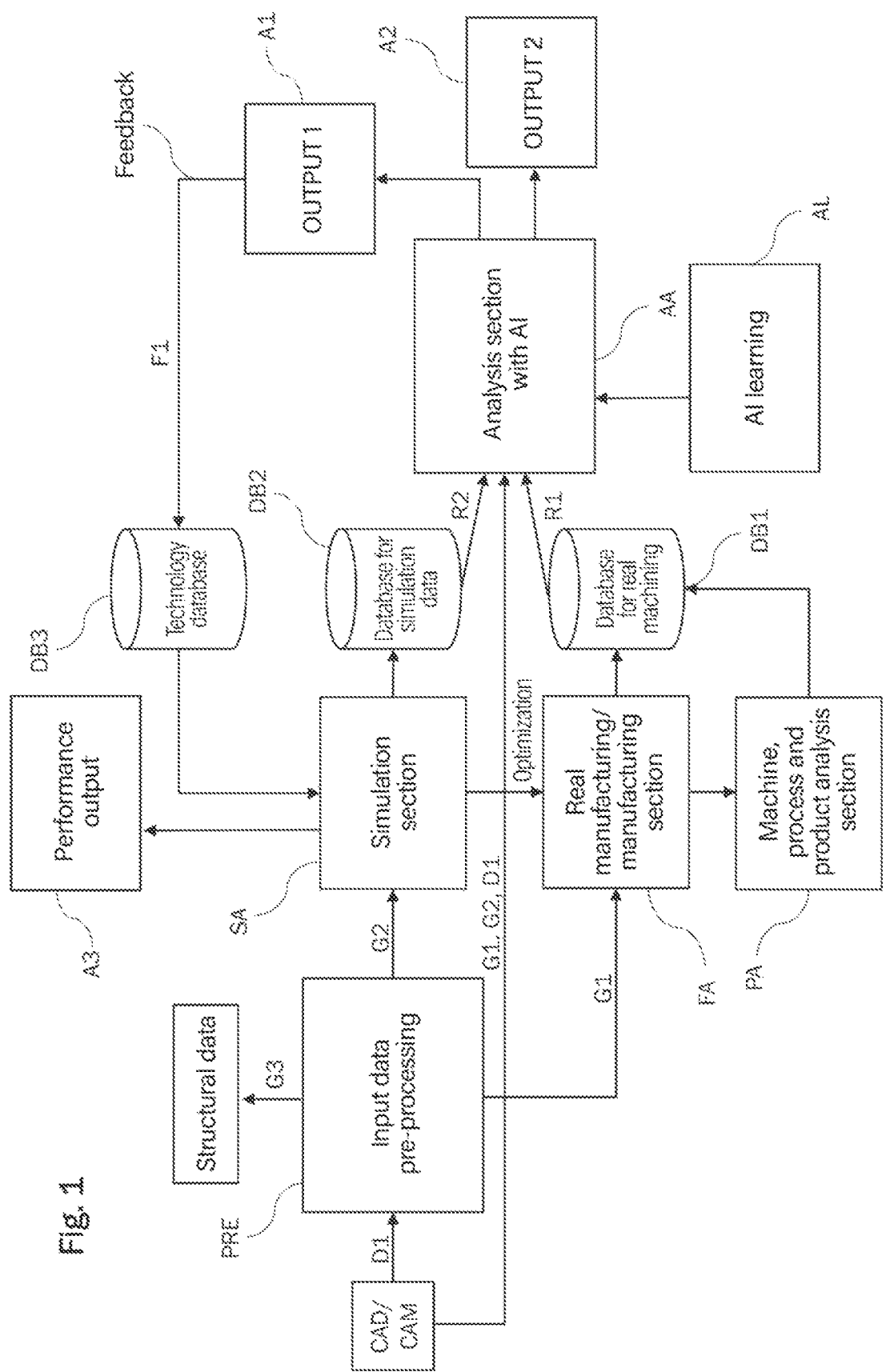
FIG. 1: shows a network representation of a first exemplary embodiment of the specified method

FIG. 1 shows a first simplified embodiment of the method according to the invention for simulating the machining process of a workpiece on an NC-controlled machine tool by means of self-learning artificial intelligence AAKI (in particular an artificial neural network) in a network representation. First, the geometric structure of the machine tool to be reproduced in a digital machine model including the workpieces and tools used as well as the work steps required for the machining process are defined via a CAD/CAM system and transferred within an operation file D1 to an input data pre-processing section PRE. Here, the operation file D1 may already be present as an NC file or the work steps involved may have already been converted into an NC format within the CAD/CAM system, but any other file formats can be read into and interpreted in the input data pre-processing section PRE, not least due to parsers implemented in the input data pre-processing section PRE.

Within the input data pre-processing section PRE, the operation file D1 is then divided according to its functional components. i.e., for example the geometric data of the machine tool, the tools and workpieces used and those of the respective work steps of the elements related to the machine tool, these are analyzed and existing work steps, if necessary, are reformatted into an NC file G1. In addition, for improved identification of each sub-process, each registered work step within the NC file receives a specified UUID which can be queried by the respective machine tool or the digital machine model during the machining process and can thus be used to identify the machining process currently in progress.

In a next step, the required information files are then transferred to the simulation section SA or manufacturing section FA provided for this purpose, thereby at the same time dividing the process into a real part (lower section of the network) and a part belonging to the simulation (upper section of the network). To control the real machine tool to be used in the manufacturing section FA, at least the NC data formatted in the input data pre-processing section PRE together with other program data used for machine control, such as identifiers or backup files, are exported within a machine file G1 from the input data pre-processing section PRE to the manufacturing section FA, in which they are transferred to the machine tool after repeated checking by means of a machine operator or an automated checking algorithm (not displayed). On the other hand, with the aid of the input data pre-processing section PRE, the simulation section SA containing the simulation software is provided with a separate simulation information file G2 which, in addition to the NC data of the machine file G1, also contains at least the geometrical structural data of the machine tool required for the creation of the digital machine model as well as further preliminary information, such as the physical properties of individual machine elements, the workpiece or tools to be used, so that the simulation section has at least sufficient information or parameters to start the corresponding simulation.

In addition, individual data processed within the input data pre-processing section PRE may, if desired, for example be reformatted into another data format such as XML or STEP by means of implemented compilers, and these can be stored in a separate data bundle G3 for the use of external simulation software or hardware, thereby allowing for, in particular, a direct comparison of different simulation engines or structures, not least even the parallel simulation on a plurality of simulation sections SA and thus the acceleration of the simulation process using a plurality of processor cores working simultaneously.

Furthermore, following the real section of the method, the real machining process in the manufacturing section FA may now be put into operation due to the provision of the NC file G1 to the machine tool. However, the course of this process has no temporal or other dependency on the aforementioned method section relating to the simulation of the machining process, but rather serves to generate reference or process parameters to be used for teaching the artificial neural network AAKI. Likewise, the number of completed machining processes within the manufacturing section FA is not fixedly defined, but may be manually specified by the operator at any time and/or may be increased at a later point in time for more precise verification of individual parameters. The latter may be obtained via a plurality of sensors that are attached to the machine tool or are external, but also by manual input of qualitative analysis processes, for example by evaluation of the finished workpiece by an expert, during or after the machining process in a so-called machine, process and production analysis section PA, wherein the process parameters ultimately obtained and bundled in this way are initially stored in a database DB1 intended for real manufacture and then forwarded as machining data R1 to the analysis section AA provided with the artificial neural network AAKI.

In equivalence to the manufacturing section of the method, when the simulation information file G2 is received in the method section relating to the simulation of the machining process, the start of the machining process simulation and thus also the associated optimization and/or learning process may be initiated. First, within the simulation section SA, using the implemented simulation software and with the help of the simulation information file G2, a corresponding digital machine model, including tools and workpieces is created, which is as similar as possible to the real machine tool of the manufacturing section and can be controlled by the machining process with the help of the NC data that are also received. In parallel to the real method section, any process parameters to be used are also determined using analysis modules integrated in the simulation section SA and these are stored in a separate simulation database DB2 by the simulation section SA in a format that is preferably the same as that of the machining data and sent as simulation data R2 to the analysis section AA. Here, too, the number and type of selected process parameters can be selected manually, depending on the use and goal of the optimization process, and/or adapted to the process parameters to be taken in the real method section so that the optimization process and/or the learning process can be used as efficiently as possible depending on the machine tool used or the machining process to be adjusted.

Continuing the optimization and/or learning process, in the next step the simulation R2 and machining data R1 (or machine tool machining data) are processed within the analysis section AA and sent as input parameters to the artificial intelligence AAKI for learning. Said artificial intelligence AAKI, in turn, is configured in such a way that it learns the behavior of the machining process on the manufacturing section FA by comparing the simulation data R2 and machining data R1 (or machine tool machining data) and, if necessary, outputs a number of simulation change parameters (machining process analysis) in the form of an output file F1, which is output, after its generation, to the iteration loop declared with the output 1 A1 and stored in the technology database DB3 provided for this purpose, as well as is fed back to the simulation section SA in order to optimize the simulation of the digital machine model.

As already described, the learning of the artificial intelligence AAKI, and thus also the generation process of the simulation data R2, may be carried out independently of the machining process on the machine tool and may therefore also be carried out before or after (or during) the manufacture of the workpiece on the machine tool. Likewise. It is also possible to train the artificial intelligence AAKI by externally introduced input parameters, shown in FIG. 1 by the process "AI learning" AL, so that maximum flexibility of the optimization process is achieved. Furthermore, the output file F1 developed by the artificial intelligence AAKI may also contain not only individual parameters to be changed by the simulation software, which may for example be adopted for the simulation via an additional marker added to the data, but also entire settings (simulation model, simulation times, frame rates etc.) or functions to be implemented (e.g., interaction functions within the models), insofar as these have previously been declared within the artificial intelligence AAKI.

The implementation of the simulation change parameters of the output file F1 in the simulation section SA may, depending on the previous steps and the devised process sequence, initiate various optimization processes: if, for example, a machining process has already been simulated to teach in the artificial intelligence AAKI, this process may be adjusted within the simulation section SA by means of the introduction of the simulation change parameters and may be consulted for further analysis (e.g., for comparison with the machining process on the machine tool). Likewise, however, it is also possible, in particular with artificial intelligences AAKI that have already been taught or trained using external data, to create prognoses for the optimization of machining processes that have not yet been implemented and thus to generate, by forwarding the output file F1 to the simulation section SA, a comprehensively new machining process simulation which is as efficient as possible.

In subsequent processes it is also possible to draw further conclusions from the optimization process of the simulation. For example, if the simulation has been successfully optimized, the decision results and system information (system change parameters, weightings, AI parameters, etc.) created by the artificial intelligence AAKI may be taken from a final output (output 2 A2) and used to get insight into and improve the actual (i.e., real) machine tool machining processes. The same happens with the simulation parameters and information created within the simulation section, which in this case is indicated in FIG. 1 with the process of "performance output" A3.

Furthermore, by optimizing the machining process simulation, direct improvements to the machining process on the machine tool as well as the learning process of the artificial intelligence AAKI may be realized. By directly connecting the simulation section SA to the manufacturing section FA or the machine tool, for example by data transmission of corresponding process data, the optimization of the simulated machining process may also be implemented in a simple manner into the machining process of the machine tool. In other words, the system shown here allows for a simultaneous adaptation of the real machining process to the improved simulated process sequences and due to these sequences, thereby making it possible to significantly accelerate machine tool optimization and thus to make it more cost-effective and efficient. In addition, it is possible to feed the optimized simulation data again into the simulation database DB2 and thus to make it available to the artificial intelligence AAKI for training and further improvement of further optimization processes. Each optimization process thus has the option of adapting the artificial intelligence AAKI even more precisely to the conditions on the real machine tool and thus to continuously improve the decisions and results of the artificial intelligence AAKI iteratively, i.e. after completing an optimization or iteration loop.

Figure 2:
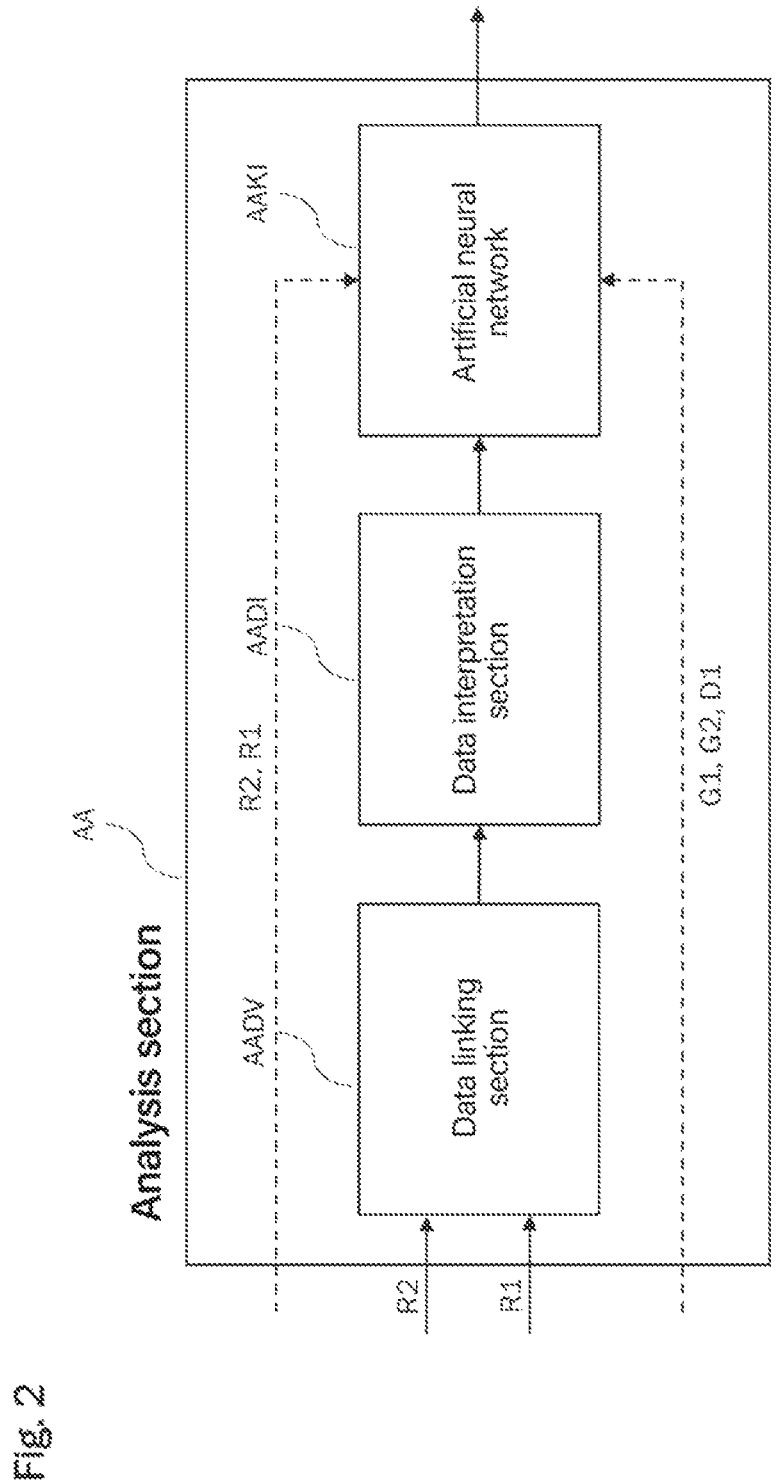
FIG. 2: shows a network representation of an exemplary embodiment of the analysis section of the specified method

FIG. 2 also shows a more detailed network description of the analysis section AA of the exemplary embodiment already shown in FIG. 1, by means of which the implementation of the learning parameters of the artificial neural network AAKI can be explained again in more detail. First, the process parameters included in the simulation R2 and machining data R1 are introduced into a data linking section AADV implemented in the analysis section AA, in which they are first analyzed by attached markers thereof and corresponding comparable process parameters emerging from the simulation data R2 and the machining data R1 are linked to one another. The latter can be implemented in several ways, for example by copying and saving separate process parameters in the intermediate storage locations provided for this purpose or, for example, by marking those parameters with their own ID numerals, and only relates to the connection of any kind of process parameters leading to the generation of learning parameters, also called input parameters, for the artificial neural network AAKI. In addition, tried and tested comparison processes, such as digital mapping, may be used to link more complex structures (e.g., time-resolved data sets) so that an optimal comparison between the simulated process parameters and those obtained on the machine tool is made possible.

The process parameter pairs and individual process parameters linked in this way are then passed on in the next step from the data linking section AADV to the data interpretation section AADI of the analysis section AA, in which they are identified again, converted into desired input parameters E1-EN for the subsequent artificial neural network AAKI and are finally introduced into the artificial neural network AAKI. Any combination or mathematical processing of the process parameters of the simulation data R2 and machining data R1 and/or input parameters, such as the NC data G1 created by the input data pre-processing section PRE, combined geometry data G2 or operation files D1 generated in the CAD/CAM system, can be understood as converting or generating of input parameters E1-EN.

Figure 3A:
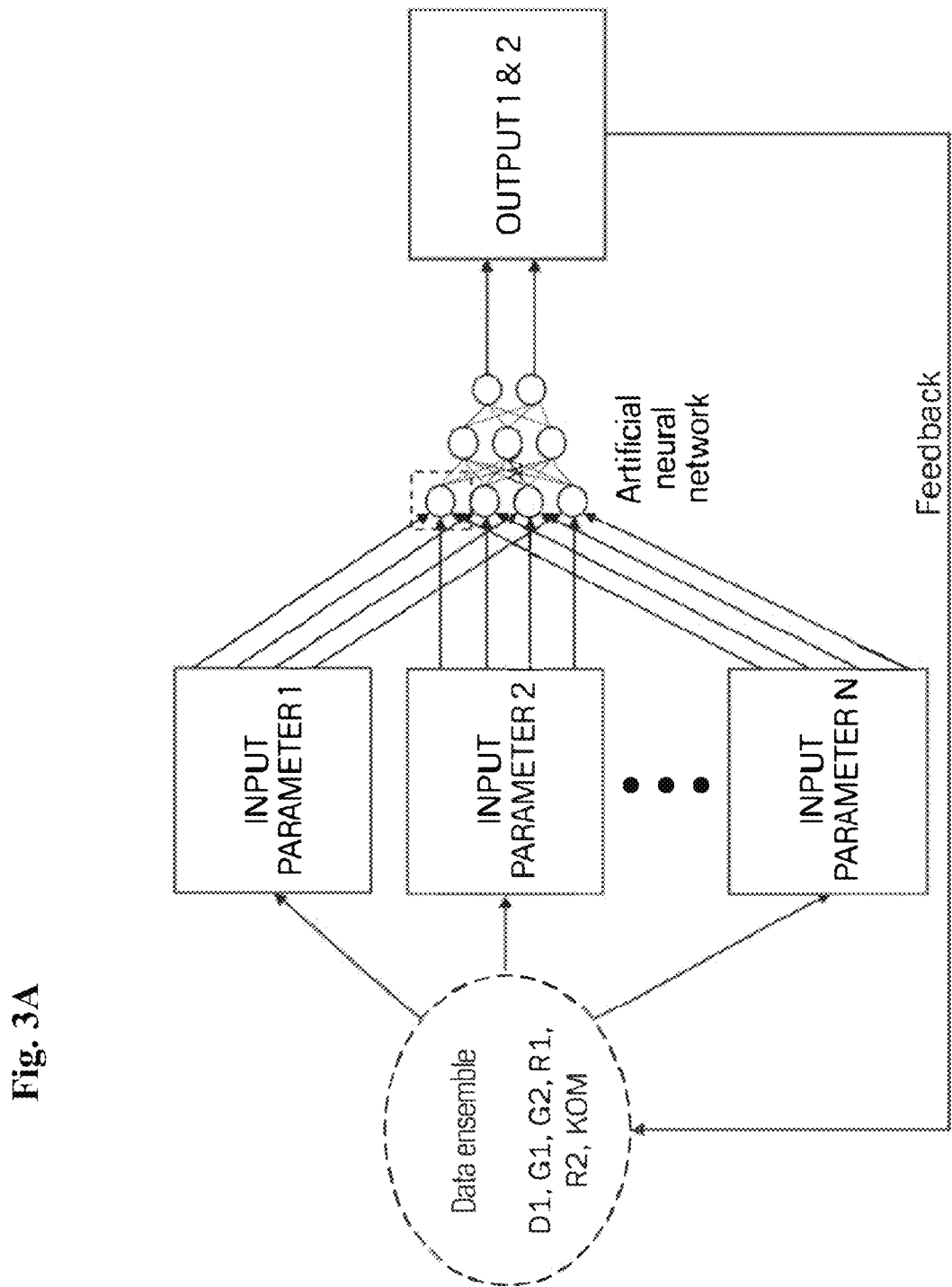
FIG. 3A: shows a network representation of an exemplary embodiment of the artificial neural network of the method
Figure 3B:
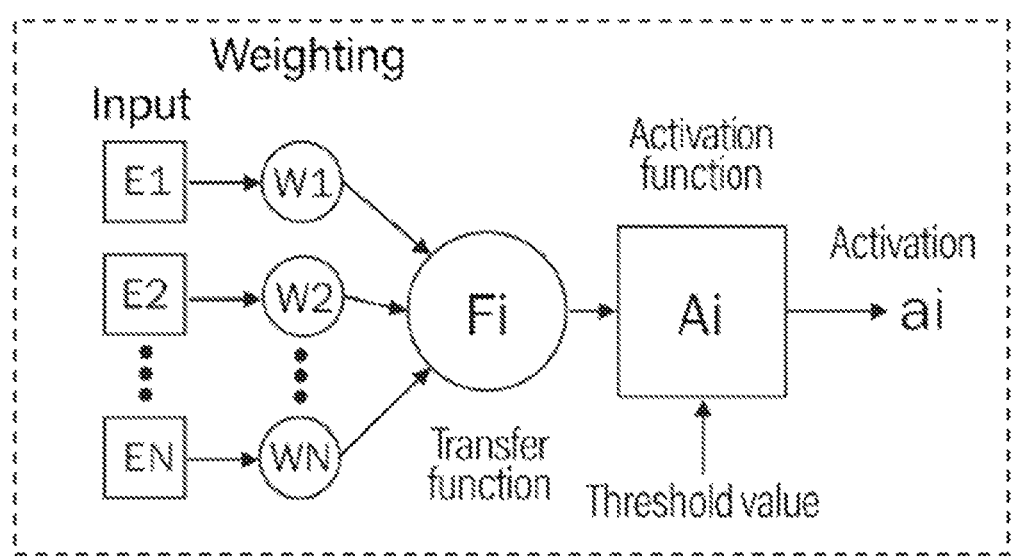
FIG. 3B: shows a network representation of the learning process of an artificial neuron of the artificial neural network of FIG. 3A FIG. 4: shows a flow chart of the procedure of the learning process of the artificial intelligence (machine learning device)

Furthermore, FIGS. 3A and 3B show a more precise representation of the learning process of the artificial intelligence AAKI, which in this exemplary embodiment is represented as an artificial neural network in the form of a further network representation. FIG. 3A showing the general input and output within the network and FIG. 3B showing a detailed representation of the decision-making process taking place in an intermediate layer within an artificial neuron. Here, the drawn structure of the network shown should be understood to be solely as an exemplary representation.

As already described, an ensemble of potential input parameters E1-EN is first generated via the accumulation of process parameters generated by the manufacturing section FA and the simulation section SA as well as other information that has come up within the previous method, which in turn is further combined via the data interpretation section AADI and ultimately can be introduced as newly combined element KOM or as one of the parameters mentioned above as an input into the first learning layer of the network. As such, according to the rules of self-learning systems and within the relevant neuron of each network layer, they are then given a weighting W1-WN for each input parameter which is assigned random values before the start of the learning phase and can be gradually changed to the desired decision weightings W1-WN over the individual learning iterations by means of a "trial-and-error" algorithm. In the usual sense, the interaction of the input parameters E1-EN with the respective weightings W1-WN may be performed via a simple multiplication $E_i \times W_i$ of the respective i-th parameters with the i-th weightings, but other or more complex functions may also be chosen in other exemplary embodiments.

In a next step, the input-weighting combination is then combined into a network input by means of a transfer function Fi. For example, according to the rules of artificial neural networks, a simple summation of the form $\Sigma_i \, E_i W_i$ may be used to create the network input, but this approach may also be varied depending on the problem and adaptation of the respective optimization attempt.

The network input in turn determines, by inputting a predefined activation function Ai, whether or not an artificial neuron activates ai upon receipt of all weighted and summarized inputs and is thus allowed to pass on information to the next layer. As a rule, a comparison is made as to whether the activation function Ai at the point of the network input exceeds a certain threshold value that must also be learned (and thus activates the neuron ai) or the value resulting therefrom is insufficient and the neuron remains in an inactive state. As in the previous cases, the activation function may be freely selected, but at least in this exemplary embodiment a sigmoid function is favored due to its shape which is continuous and differentiable at every point.

By teaching the artificial neural network, selected inputs EN may thus be transported from one network layer to the next using the weightings WN obtained with the aid of the learning process and thus may be ultimately transferred to outputs 1 and 2 in the last layer as the preferred simulation parameters. Depending on the network structure, these can also be returned to the original input ensemble, for example in a recurrent network system, or to a specific neuron or layer so that a feedback system created from the output files is developing. The learning of the network, or the aforementioned weightings W1-WN, and in special cases also the threshold value, may be carried out before the input parameters E1-EN are actually provided, for example with previously defined training data, and may therefore be viewed independently of the actual optimization process.

Figure 4:
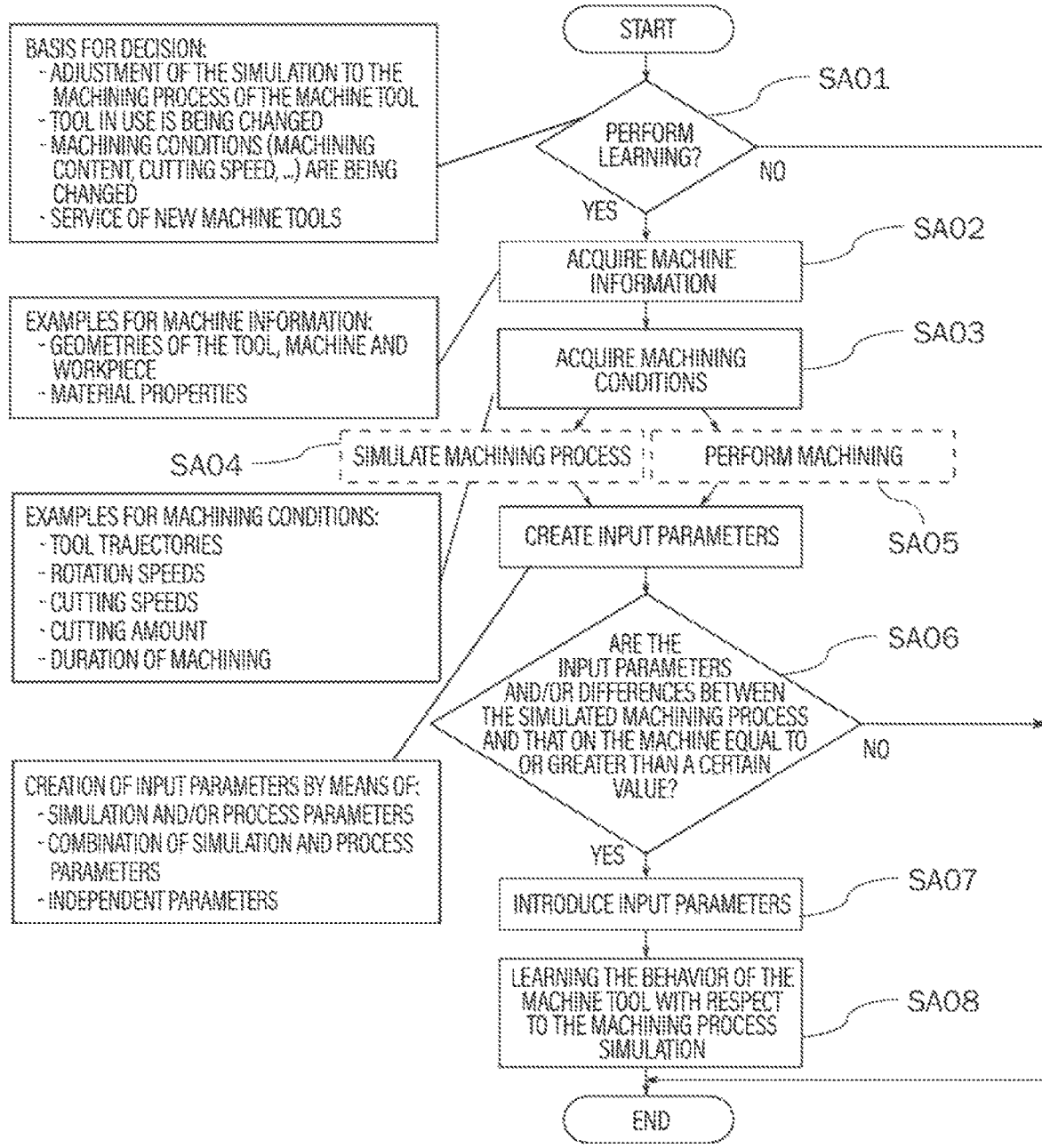

FIG. 4 shows the structure of the learning process again using a flowchart describing the learning procedure, wherein "start" is understood as a general operating concept for performing a training process of the AI and "end" is understood as successfully teaching the AI the desired features. Each learning process begins with the general decision of the system (or a person) to want to carry out SA01 a learning process of the artificial intelligence AAKI, wherein various factors may be involved as a basis for these decisions. The learning process may be used, for example, to develop prognoses for new tools to be inserted, operating modes or machine tools to be newly restored, but also to adapt existing machining process simulations in general to desired circumstances, for example to the operational procedure of the machine tool, and thus to increase the accuracy and efficiency of the simulation. If the decision is successful, the machine information SA02 and machining conditions SA03 required for the training process are then collected and first prepared for the introduction into the analysis section AA integrated with the artificial intelligence AAKI. All physical information about the machine tool, i.e. for example geometries, sizes, material properties or physical characteristics of the tool, workpiece and/or the individual machine tool elements, which can be used to successfully describe the machining process to be learned, may be considered to be machine information. Likewise, all those machine settings or conditions, such as tool trajectories, rotation speeds or machining speeds, which must be applied to the individual (simulated) elements of the machine tool in order to implement the machining process mentioned above, may be considered to be machining conditions. Said data may be generated from externally stored data sets (e.g., a server or a cloud). Optionally, however, they may also be supplemented or overwritten by result parameters from machining process simulation SA04 or machining processes on machine tools SA05 performed in parallel or previously so that current information on tool machining can be fed into the learning process of the artificial intelligence at any time and continuously.

Moreover, the direct comparison of the simulation results with the real machining conditions allows for a further analysis and decision process SA06 to be implemented in the next step. After creating the input parameters defined for the artificial intelligence AAKI, for example in the manner already mentioned, a decision may be made by comparing the simulation R2 and machining data R1, but also by means of the input or other parameters per se, as to whether learning of the artificial intelligence AAKI is necessary at all or, for example, the current simulation settings already meet the desired conditions. For this purpose, for example, the above-mentioned parameters may be compared with specifically defined limit values and, if they fall below the limit value, they may be used to automatically continue the learning process, thereby realizing an individual trigger for each simulation or learning process. As a consequence of a positive decision ("yes"), the input parameters may also be introduced SA07 into the analysis section AA or the artificial intelligence AAKI according to the above-mentioned steps and the learning process SA08 may be started.

Figure 5:
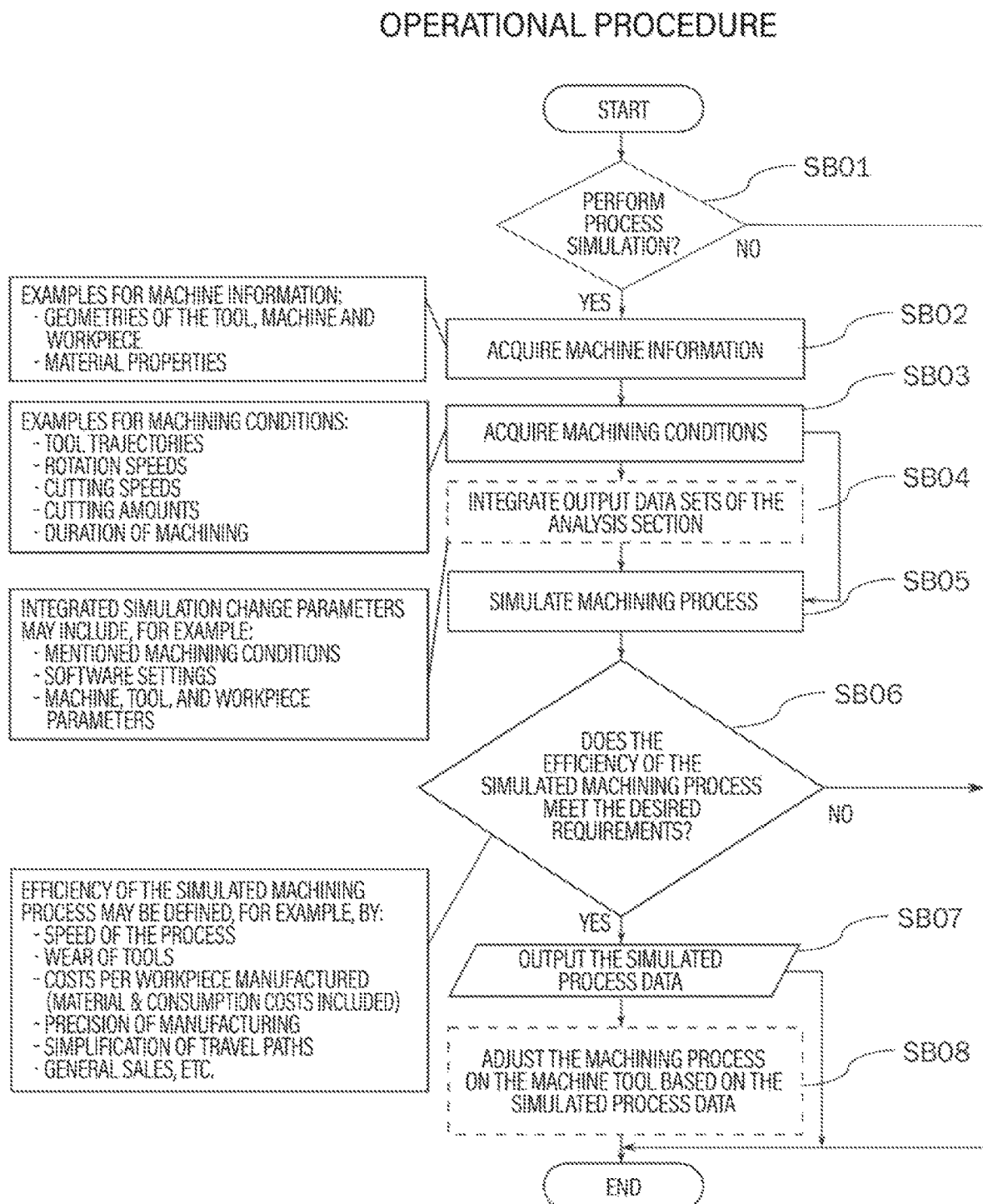
FIG. 5: shows a flow diagram of the operational procedure of the simulation section

FIG. 5 further shows the structure of the operational procedure of the machining process simulation as well as continuing processes on the basis of another flow chart. In this case, "start" should be seen as the general operational concept for starting the machining process simulation and "end" should be seen as the successful completion of the same simulation.

Similarly to the diagram structure of the learning process, each simulation process first begins with the decision to carry out the learning process SB01, wherein this decision may be made either manually, e.g. by an employee, or automatically, e.g. by an integrated program code or the artificial intelligence AAKI. Similarly, if the input is positive ("yes"), the (digital) machine information SB02 and machining conditions SB03 required for the simulation are acquired from available servers, cloud services or other types of databases and prepared for implementation in the corresponding simulation section Sat. The former may include both the aforementioned information data about the physical or kinematic conditions of the machining process, as well as general software settings relating to the simulation (e.g., engine to be used, simulation models, parameters to be set in the software).

In a next optional step, the machine information and machining conditions to be introduced or the simulation parameters to be obtained therefrom may also be adapted by introducing the simulation change parameters generated by the analysis section AA and may thus be optimized SB04 using the decisions of the trained artificial intelligence AAKI. Depending on the machining process, the simulation change parameters or the output file F1 containing these parameters may be output directly from the analysis section AA or taken from existing databases (e.g., the technology database DB3), provided that the machine properties associated with these correspond to the machine information and machining conditions of the machining process simulation currently to be simulated.

If the simulation parameters to be used for the simulation then correspond to the desired specifications, the machining process simulation is started and subsequently evaluated SB05, which means that the actual simulation process may be considered to have ended. In a continuing method, however, it is possible, after comparing certain conditions SB06 (does the efficiency or the result of the simulation, for example, correspond to certain requirements), to use the results or knowledge gained from the machining process simulation for the machining process on the machine tool. For example, after ensuring the quality of the simulation results (SB06—"yes"), the latter may initially be output separately SB07 and transmitted and/or reused for further use, e.g. to analyze possible inefficiencies within the machine tool. In addition, it is also (optionally) possible to transfer the simulation results, but also, for example, the simulation parameters used in machining process simulations classified as efficient, directly to the machine tool SB08 and thus to realize the efficiency and process increases gained via the optimized simulation also on the actual tool machine.

Figure 6:
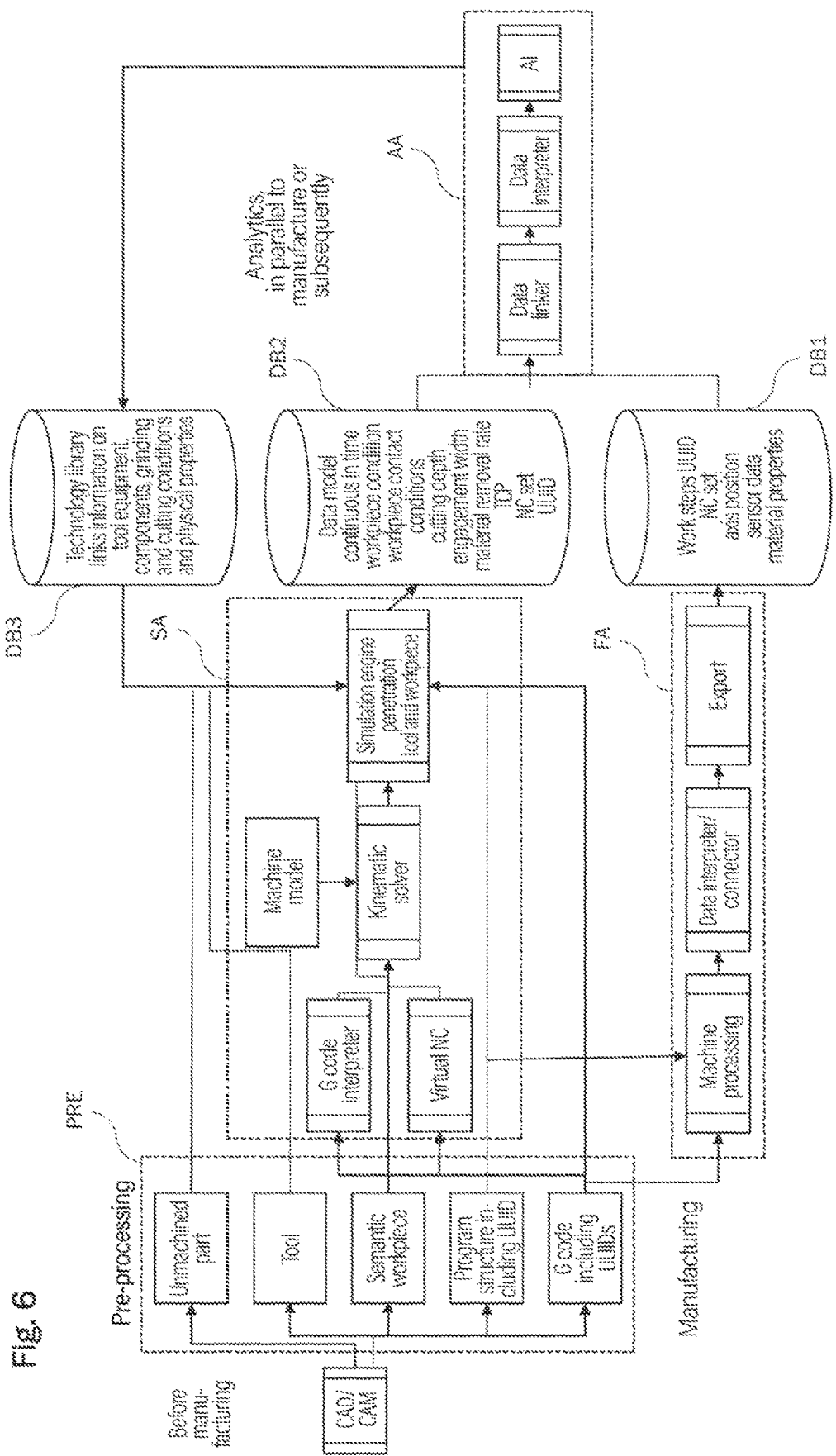
FIG. 6: shows a network representation of a second exemplary embodiment of the specified method

FIG. 6 also shows a detailed view of a network representation of an exemplary embodiment similar to that shown in FIG. 1, wherein, in particular, further elements and interactions between the various method sections are shown. In this figure, for example, the communication paths of the individual, equally exemplary elements of the input data pre-processing section PRE are shown and linked to the components of the simulation section SA and the manufacturing section FA. As an example of this, the element of the program structure, for example the geometric data of the digital machine model or the NC data already defined as G codes in this case, are fed both to the manufacturing section FA recorded for manufacturing the real workpiece and the simulation section SA located in the simulation engine Io. Other elements that have not yet been described are the G code interpreters in the simulation section SA, which first read the G codes of the NC data generated in the input data pre-processing section PRE and introduces a kinematic solver to implement the movement data of individual machine elements into the model to be used for simulation, and the virtual NC, which creates a virtual copy of the NC data in parallel to the interpretation of the respective NC data G-code and thus makes them receivable for the aforementioned kinematic solver. In addition, reference should be made to the individual parameters stored within the aforementioned databases DB1, DB2, DB3, but in particular to the parameters stored in the simulation database DB2, which, for example, in addition to the process parameters of the simulation section SA already described, also contain further information related to the simulation, such as the TCP, and thus offer a wide variety of parameters to be used for teaching the artificial intelligence AAKI.

FIG. 7 also shows an exemplary comparison of various analysis parameters to be obtained using the real machine tool and a digital machine model, an indicated x expressing the possibility of obtaining the respective parameter. Said data may be used, for example, as training data for the artificial intelligence AAKI. In particular, it is apparent from this example that, compared to the real machine tool, a large number of other elements, such as the depth or width of engagement of the respective tool in the workpiece, can be easily obtained and adopted for analysis and improvement of the respective machining process. In this respect, especially in complex, difficult to implement and/or costly introductory phases of new machine tools, the implementation of the machining process in a digital machine model offers a cost-effective and efficient method for improving the process flow.

The present features, components and specific details can be exchanged and/or combined in order to create further embodiments, depending on the intended use. Any modifications that are within the scope of knowledge of the person or ordinary skill in the art are implicitly disclosed in the present description.

The invention claimed is:

1. A computer-implemented method for simulating a machining process of a workpiece on a machine tool as a function of numerical control (NC) data and/or PLC data, wherein a digital machine model of said machine tool is used to simulate the machining process, said method comprising:
   executing a digital machining process by simulating the machining process on said digital machine model in a simulation section based on the NC data and/or PLC data, and storing simulation data;
   recording machining data of the machining process on said machine tool, the machining process being carried out as the function of the NC data and/or PLC data;
   feeding the simulation data of said digital machining process and the machining data of said machining process on said machine tool to an artificial intelligence comprised in an machine learning section of an analysis section and linking the simulation data and the machining data, by an algorithm, in the machine learning section in order to let the artificial intelligence learn a behavior of said machine tool, a tool and/or the workpiece to be machined based on the linked data so that the artificial intelligence is at least able to recognize differences between the machining process on the digital machine model and the machining process on the machine tool, analyzing, in the analysis section and based on the machine learning section and at least the simulation data transmitted to the analysis section, the simulated machining process concerning improvements of the simulated machining process and outputting result of the analysis concerning improvements of the simulated machining process, wherein the artificial intelligence of said analysis section learns the behavior of said machine tool, the tool and/or the workpiece of said machine learning section based on the simulation data of the digital machining process and the machining data of the machining process and the output is performed by outputting an output data set:

feeding back, from the analysis section, the output data set of said analysis section to said simulation section for adapting the digital machining process;

transmitting, from the simulation section, a result and/or parameters of the adapted digital machining process to the machine tool; and controlling the machine tool to process the workpiece based on the result of the result and/or parameters of the adapted digital machining process.

2. The computer-implemented method according to claim 1, wherein said analysis section learns the behavior of said machine tool, the tool and/or the workpiece of said machine learning section based on the simulation data of the digital machining process and the machining data of the machining process and outputs it preferably as the output data set.

3. The computer-implemented method according to claim 1, wherein, in order to link the simulation data to the machining data, sensor data of said machine tool are associated with corresponding analysis data of said simulation section via continuous data mapping, based on a temporal association of corresponding operations, NC lines and/or axis positions.

4. The computer-implemented method according to claim 1,
wherein the simulation of the machining process, the feeding of the simulation data into said analysis section, the feeding back of the output data set to said simulation section and changing of simulation parameters in said simulation section based on the output data set are formed into a program loop for continuously adapting the simulation of the machining process.

5. The computer-implemented method according to claim 1,
wherein at least one simulation parameter is changed based on the output data set of said analysis section within said simulation section, and
wherein the simulation data generated from the simulation or at least one process parameter of the simulation data are stored in a simulation database before being fed into said analysis section.

6. The computer-implemented method according to claim 1,
wherein, for each process parameter within the machining data, at least one corresponding process parameter exists within the simulation data and/or is generated within the simulation process and the respective process parameter is associated with the machining data, and
wherein the machining data and the simulation data are compared within said analysis section and input parameters for said machine learning section are defined by comparing the machining data and the simulation data.

7. The computer-implemented method according to claim 1,
wherein the digital machining process is carried out in parallel to or before the machining process on said machine tool and, by outputting the simulation data and the machining data to said analysis section, real-time output of performance data of a current machining process is made possible, and preferably instructions for optimizing the machining process on said machine tool are output.

8. The computer-implemented method according to claim 1,
wherein said machine learning section is an artificial neural network configured to optimize the simulation parameters of the simulation of the machining process in such a way that there is as minimal a difference as possible between a selected process parameters of the machining data and the simulation data.

9. The computer-implemented method according to claim 1,
wherein the learning of the machine learning section and an optimization of the simulation process are carried out by said machine learning section in parallel and/or independently of the machining process on said machine tool.

10. The computer-implemented method according to claim 1,
wherein the output data set output by said machine learning section is stored in an expandable technology database, and
wherein said machine learning section accesses the output data sets stored in said technology database for feedback of the learning process.

11. The computer-implemented method according to claim 1,
wherein a same NC data are used for the machining process on said machine tool and for the simulation of the machining process on said digital machine model in order to match work steps between the machining process and the simulation process.

12. The computer-implemented method according to claim 1,
wherein physical parameters of said machine tool, the tools and the workpiece to be machined are output by the simulation of the machining process on said digital machine model and the physical parameters of said machine tool, the tools and the workpiece to be machined are defined depending on a time of the machining process and/or a respective work step.

13. The computer-implemented method according to claim 1,
wherein the NC data for identifying a respective work step are provided with an additional marker, and
wherein said machine tool and said digital machine tool model can be interpreted using said marker within the NC data, thereby making it possible to track in which work step and/or in which position said machine tool and/or said digital machine tool is at a determinable point in time.

14. The computer-implemented method according to claim 1, wherein work steps of the machining process are additionally output as structural data for an interpretation of the work steps in other simulation devices, and wherein said machine tool and said digital machine model can extract and implement work steps and/or process information from other data formats via a parser.

15. The computer-implemented method according to claim 14, wherein the structural data are output as an XML, file or as a STEP file for interpretation of the work steps in other systems.

16. An apparatus for controlling a machining process of a workpiece by a machine tool as a function of numerical control (NC) data and/or PLC data, comprising:

the machine tool configured to machine said workpiece using specified NC data and/or PLC data; and a processor coupled to a memory storing instructions to permit the processor to function as:

a simulation device configured to be controlled independently of said machine tool to simulate the machining process on a digital machine model based on the specified NC data and/or PLC data; and an analysis unit connected to said machine tool and said simulation device and configured to adapt simulation parameters within said simulation device, wherein said machine tool is configured to transmit machining data of the machining process on said machine tool to said analysis unit and said simulation device is configured to transmit simulation data of the machining process simulated on said digital machine model to said analysis unit, wherein said analysis unit is configured to use transmitted machining data and the simulation data to let an artificial intelligence comprised in a machine learning section arranged in said analysis unit learn a behavior of said machine tool, the tool and/or a workpiece to be machined so that the artificial intelligence is at least able to recognize differences between the machining process on the digital machine model and the machining process on the machine tool and, based on the machine learning section and at least the simulation data transmitted to the analysis unit, to output a result of an analysis of the machining process concerning improvements of the simulated machining process, wherein the artificial intelligence of said analysis unit is configured to learn the behavior of said machine tool, the tool and/or the workpiece of said machine learning section based on the simulation data of the digital machining process and the machining data of the machining process and the analysis unit is configured to output the result as an output data set, wherein the analysis unit is configured to feed back the output data set to said simulation device for adapting the digital machining process, wherein the simulation device is configured to transmit a result and/or parameters of the adapted digital machining process to the machine tool, and wherein the machine tool is controlled to process the workpiece based on the result of the result and/or parameters of the adapted digital machining process.

17. The apparatus according to claim 16, wherein said machine tool, said simulation device and said analysis unit are configured to transmit data to each other, in particular parameter and/or performance data and/or hardware and/or program data, and wherein the data are transmitted via an intranet and/or via Internet.

18. The apparatus according to claim 16, wherein said simulation device and said analysis unit are independent of the machining process on said machine tool, and wherein said analysis unit is configured to continuously match the machining process on said digital machine model to the machining process of said machine tool by transmitting the output data set of said machine learning section to said simulation device.

* * * * *